Nov. 3, 1953

J. E. EVANS ET AL 2,658,148

GENERATOR COUPLING CIRCUIT

Filed Feb. 18, 1946

INVENTORS
JOHN E. EVANS
FOSTER F. RIEKE
BY William D. Hall
ATTORNEY

Patented Nov. 3, 1953

2,658,148

UNITED STATES PATENT OFFICE 2,658,148

GENERATOR COUPLING CIRCUIT

John E. Evans, Oak Hill, Ohio, and Foster F. Rieke, Belmont, Mass., assignors, by mesne assignments, to the United States of America as represented by the Secretary of War Application February 18, 1946, Serial No. 648,523

5 Claims. (Cl. 250—36)

This invention relates in general to tunable electronic oscillator circuits, and more particularly to such circuits adapted to operate in the centimeter wavelength range.

As the design of electronic oscillators has evolved so that higher and higher frequencies of oscillations can be generated, the size and spacing of the elements within the thermionic tubes contained in such circuits, in general have become smaller and smaller. In a few specific means, the dimensions of the tube elements and/or the distances between tube elements may be large; i. e., of the order of a wavelength. The latter tubes must have these dimensions, as percentages of a wavelength, carefully chosen. In general, however, it may be said that the tubes adapted for the generation of hyper frequencies have less power-handling capacity than tubes designed for use in the low frequency range, because the amount of power a tube can handle is determined to a first approximation by the amount of power dissipating surface area there is in association therewith.

Therefore, if high power is desired in the centimeter wave region in a tube such as the magnetron, for instance, one cannot in general go to tubes with larger or more massive elements because the size of the elements that would be desired for proper heat dissipation would be in conflict with the size of the elements necessary for proper operation in the high frequency ranges, as stipulated above.

Among the objects of the present invention, therefore, are:

1. To provide an oscillating thermionic tube circuit for the generation of hyper frequencies, preferably a magnetron; and 2. To provide such a circuit embodying tubes wherein relatively large amounts of power are generated.

In accordance with the present invention there are provided two magnetrons coupled through wave guides to a coaxial line T-junction. The distances between the magnetrons are so chosen that each magnetron sees the other as an effective parallel resonant circuit. The operation of the circuit will be more fully discussed hereinafter in this specification.

This invention will best be understood by reference to the drawings, in which.

Figure 1:
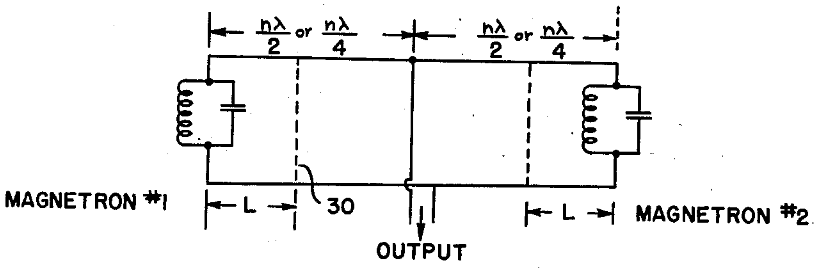
Fig. 1 is an equivalent circuit diagram of two magnetrons operating in parallel.

Referring now to a description of the invention and to Fig. 1, there is shown a circuit diagram which, with the proper lengths of line, as shown between the parallel resonant circuits and the output line, may be made to be electrically equivalent to the system of the present invention. In this diagram, the magnetrons are thought of as acting as parallel resonant circuits plus a certain length L of transmission line.

Figure 2:
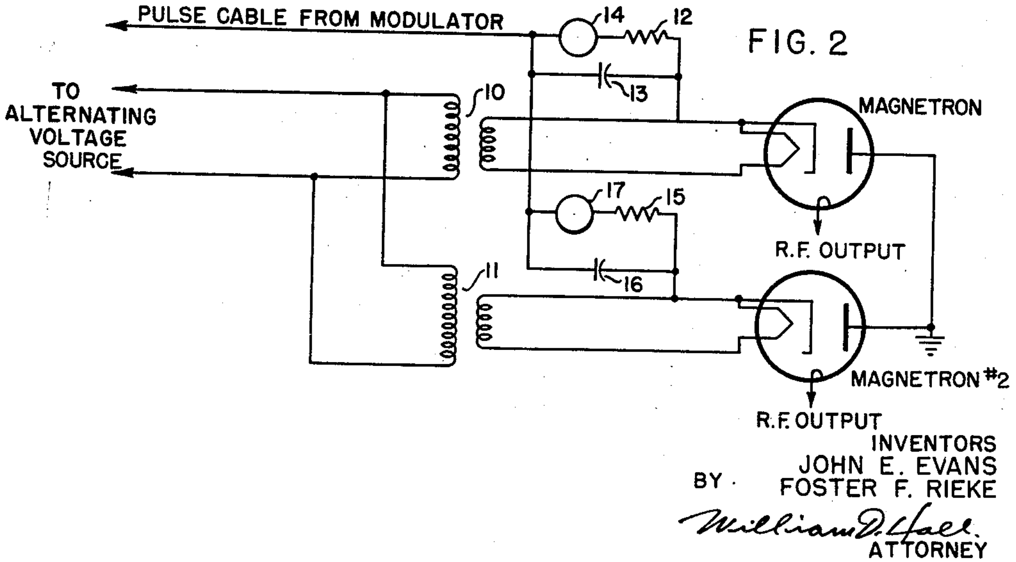
Fig. 2 is a power distribution circuit for the system of the two parallel magnetrons.

Fig. 2 is a circuit diagram of one type of power distribution system that may be employed for the two magnetrons #1 and #2. The anodes of the tubes are placed at ground potential. The heaters of the tubes are fed from separate filament transformers 10 and 11, the primaries of which are coupled to an alternating voltage source. If the system is one of the pulse modulated type, as is often the case, the pulse from the modulator is brought to the two cathodes in parallel. Coupling the pulse cable to the cathode of magnetron #1 is a parallel network of resistor 12 and condenser 13, with an ammeter 14 in the resistor branch thereof. Likewise, coupling the pulse cable to the cathode of magnetron #2 is a parallel network of resistor 15 and condenser 16, with an ammeter 17 in the resistor branch thereof.

Figure 3:
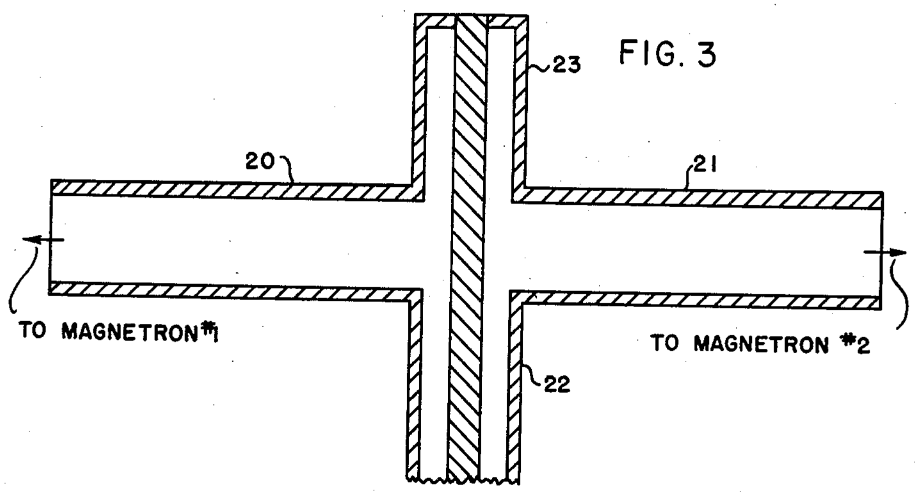
Fig. 3 is a cross sectional view of a type of coupling means which could be used in the present system.

Fig. 3 is a cross sectional view of a T-junction which may be used to combine the output energies from the two magnetrons. Magnetron #1 is coupled to one wave guide branch 20 of the T-junction, while magnetron #2 is coupled to the other wave guide branch 21. For the purpose of extracting energy from the two wave guides a coaxial line 22 is positioned mid-way between the two magnetrons, if both sides are symmetrical. The center conductor of the coaxial line is supported mechanically at its end by a stub support 23. The effective length of this stub is a quarter of a wavelength at the operating frequency so, since the stub is shorted at one end, there is a high impedance looking into the stub at the junction of the stub and the wave guides, and so the stub has very little effect on the electromagnetic waves in the system.

Referring now to a description of the operation of the system and to Fig. 1, it is here assumed that a magnetron together with its coupling acts electrically as if it were a parallel resonant circuit and a certain length L of transmission line. That is, the circuit to the left of the dotted line 30 is considered to be the approximate electrical equivalent of a magnetron as seen from the outside of the coupling means. That is, if an instrument were connected at the output of the magnetron, this instrument being insensitive to effects from the direction of the T-junction point of the circuit, and only be effected by the manner in which the circuit elements on the magnetron #1 side of the dotted line 30 perform, this instrument would be said to "see" only the characteristics of the circuit to the left of this dotted line. A series resonant circuit plus a length of transmission line could have been chosen for the equivalent circuit of the magnetron, in which case the length of line would be a quarter of a wavelength different from the length of line in the equivalent circuit of Fig. 1.

It is desirable that the two magnetrons used be of nearly identical characteristics, and that the output couplings of the two tubes have equal impedance characteristics as far as is possible. For effective parallel operation, each magnetron must see the other as a parallel resonant circuit. This will occur if the effective distance between the two magnetrons is an integral number of half wavelengths inside the wave guide. It can be seen, however, that since the length of line L is in general unknown, the physical distance between the two tubes must be determined by instrumentation. Actually, the lengths of the T arms are so chosen that the frequency of the magnetron is least stable with a high standing wave ratio in the line when the minimum in the standing wave pattern is at the T. With a constant standing wave ratio in the output line from the magnetron, as the phase of the standing waves in the line is varied through 180°, the magnetron, besides varying in frequency and output power, goes through a region of poor stability to one of good stability and back again to one of poor. Thus the region in which the magnetron is least stable may be determined from the operating characteristics.

In the diagram in Fig. 1, it is seen that one desirable operating condition in which the above requirements would hold is the positioning of the two magnetrons at such a distance apart that the effective parallel resonant circuits are an even number of integral half guide wavelengths apart. In this configuration, the oscillations within the two tubes would "lock in," or synchronize, in phase. It it also possible to place the two magnetrons at such a distance that these effective parallel resonant circuits are an odd number of half guide wavelengths apart. In this case, the oscillations would synchronize 180° out of phase.

Due to the circuitry, the load conductance is divided substantially equally between the two magnetrons and so, if each magnetron as coupled to its line has a loaded Q equal to $Q_L$, the loaded Q of the combination is $2Q_L$. To obtain good coupling, this value of $Q_L$ should be rather small.

In the pulse distributing and monitoring circuit shown in Fig. 2, it is necessary to have a filament transformer for each magnetron, in order that the average current ammeters 14 and 17 read the individual magnetron currents. These two currents can be adjusted to substantial equality by proper setting of the magnetic fiields for the individual magnetrons.

In one operation of the system, two so-called "K-7" magnetrons were run with a magnetic field of 1200 gauss and at 12-15 D.-C. amperes each, on the maximum of the pulse. The radio frequency output had a frequency spectrum similar to that of a single magnetron, thus showing that the two tubes had "locked in." It was further found that the tube characteristics as a function of load were much the same as those of a single magnetron. The maximum efficiency obtained was about 38%. If one magnetron was turned off it was found that the radio frequency power dropped to about half of its former value.

It will be understood in the interpretation of this specification, that not only two but any number of magnetrons may be placed effecively in parallel in accordance with the principles set forth above. Furthermore, it is seen that there are other types of hyperfrequency oscillators which may be coupled into a common output line utilizing in general the principles set down here, it being of course necessary to make slight modifications with respect to the properties peculiar to each type of oscillator used.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In combination, a plurality of magnetrons for generating high frequencies, an output transmission line means, and a plurality of connecting transmission line means, each of said connecting transmission line means coupling one of said high frequency magnetrons to said output transmission line, the distance between any one of said high frequency magnetrons and any other of said high frequency magnetrons as measured along said connecting transmission line means being effectively an integral number of half-wavelengths, said wavelengths being those occurring within said connecting transmission line means.

2. In combination, a plurality of oscillating high frequency oscillation generators, an output transmission line, and a plurality of equal length coupling transmission lines, each of said coupling transmission lines connecting one of said high frequency oscillation generators to said output transmission line, the distance between any one of said high frequency oscillation generators and any other of said high frequency oscillation generators as measured within said coupling transmission lines being effectively an integral number of half-wavelengths as measured at the operating frequency of the system.

3. In combination, a plurality of magnetrons for generating high frequencies, an output transmission line, and a plurality of coupling transmission lines, each of said coupling transmission lines connecting one of said high frequency magnetrons to said output transmission line, the distances between said high frequency magnetrons as measured along said coupling transmission lines being effectively an integral number of half-wavelengths as measured at the operating frequency of the system.

4. In combination, a plurality of high frequency generator means, an output transmission line means, and a plurality of coupling transmission line means, each of said coupling transmission line means connecting one of said high frequency generator means to said output transmission line means, the distances between said high frequency generator means as measured along said coupling transmission line means being effectively an integral number of half-wavelengths as measured at the operating frequency of the system.

5. The combination of claim 3, further including a plurality of current measuring means respectively connected to said magnetrons, for measuring the respective magnetron loading, whereby the effective length of said coupling transmission lines may be determined.

JOHN E. EVANS.
FOSTER F. RIEKE.

References Cited in the file of this patent

UNITED STATES PATENTS

| Number | Name | Date |
|---|---|---|
| 2,110,448 | Linder | Mar. 8 ,1938 |
| 2,113,225 | Wolff | Apr. 5, 1938 |
| 2,258,148 | Schussler | Oct. 7, 1941 |
| 2,270,771 | Schonfeld | Jan. 20, 1942 |
| 2,464,115 | Bull | Mar. 8, 1949 |
| 2,472,200 | Everhart | June 7, 1949 |
| 2,514,678 | Southworth | July 11, 1950 |